(12) United States Patent
Nishida

(10) Patent No.: US 7,147,816 B2
(45) Date of Patent: Dec. 12, 2006

(54) METHOD FOR INJECTION MOLDING OF THE HOLLOW BODY

(75) Inventor: Shoso Nishida, Hiroshima (JP)

(73) Assignee: The Japan Steel Works, Ltd., Tokyo (JP)

(*) Notice: Subject to any disclaimer, the term of this patent is extended or adjusted under 35 U.S.C. 154(b) by 232 days.

(21) Appl. No.: 10/764,601

(22) Filed: Jan. 27, 2004

(65) Prior Publication Data

US 2005/0037167 A1 Feb. 17, 2005

(30) Foreign Application Priority Data

Jan. 27, 2003 (JP) .......................... P2003-016954

(51) Int. Cl.
B29C 45/04 (2006.01)
B29C 45/10 (2006.01)
B29C 45/14 (2006.01)
B29C 45/56 (2006.01)

(52) U.S. Cl. .................................. 264/255; 264/328.7

(58) Field of Classification Search ................ 264/255, 264/328.7, 328.8, 328.13
See application file for complete search history.

(56) References Cited

U.S. PATENT DOCUMENTS 5,902,534 A * 5/1999 Fujishiro et al. ............ 264/255

6,042,364 A 3/2000 Nishida
6,596,218 B1 * 7/2003 Klotz ........................ 264/255

FOREIGN PATENT DOCUMENTS

| JP | 2-38377 B2 | 8/1990 |
| JP | 6-23789 A | 2/1994 |
| JP | 6-23790 A | 2/1994 |
| JP | 6-246781 A | 9/1994 |
| JP | 7-9475 A | 1/1995 |
| JP | 10-16064 A | 1/1998 |
| JP | 10-166409 | * 6/1998 |
| JP | 10-166449 | * 6/1998 |
| JP | 11-179754 A | 7/1999 |
| JP | 2000-153538 A | 6/2000 |
| JP | 2002-355852 A | 12/2002 |

* cited by examiner

Primary Examiner—Jill L. Heitbrink
(74) Attorney, Agent, or Firm—Sughrue Mion, PLLC

(57) ABSTRACT

A pair of primary semi-hollow bodies formed by primary injection molding are united together by the molten resin injected for secondary injection molding to fill a joining space defined about the butt ends of the primary semi-hollow bodies having their open ends butted against each other. The molten resin for secondary molding fills the space between the butt ends, or the notch portion, too. Alternatively, the molten resin is compressed after filling the joining space and the space between the butt ends.

3 Claims, 6 Drawing Sheets

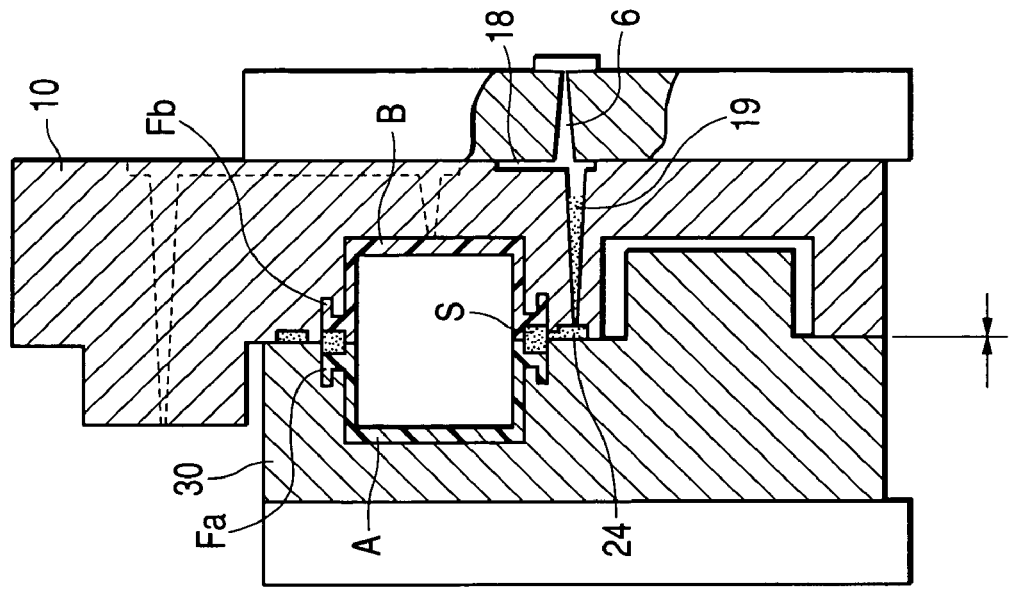
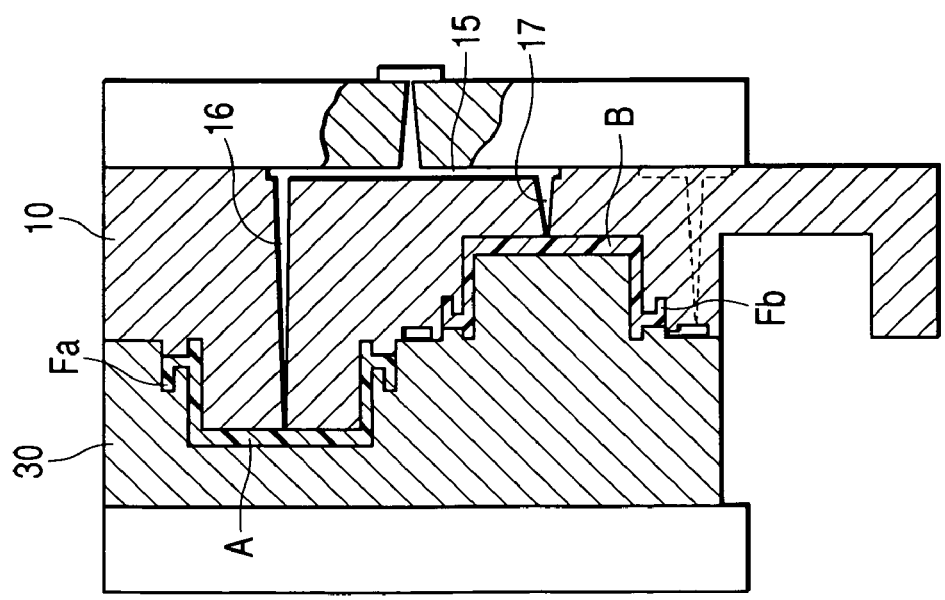
FIG. 3A
FIG. 3B

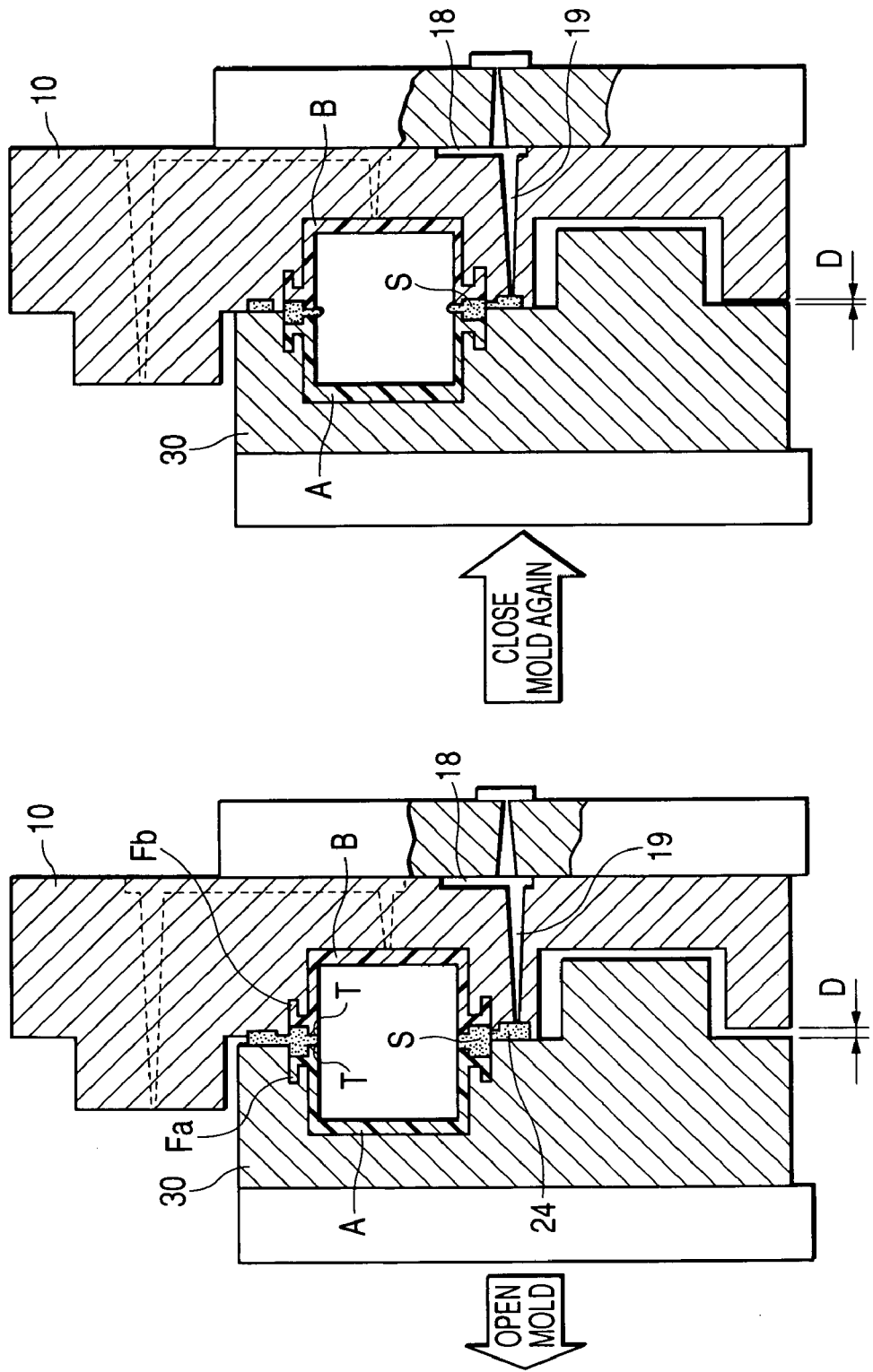

METHOD FOR INJECTION MOLDING OF THE HOLLOW BODY

The invention is based on Japanese Patent Application No. 2003-16954, the entire contents of which are incorporated herein by reference.

BACKGROUND OF THE INVENTION

1. Field of the Invention

This invention relates to a hollow body of a synthetic resin, a method for its injection molding and a mold for its molding, and more specifically, to a hollow body of a synthetic resin made by joining a pair of semi-hollow bodies along a joining space, a method for molding such a hollow body of a synthetic resin by primary and second injection molding and a mold used for carrying out the molding method. More particularly, it relates to a hollow body of a synthetic resin which is suitable for a gasoline tank to be mounted in a motor vehicle, a method for its injection molding and a mold for its molding.

2. Related Art

A molding method using an injection molding machine is known as one of the methods for molding a hollow body, or a hollow molded product of a synthetic resin. A mold used for carrying out such a method for injection molding is generally composed of a stationary mold and a slidable mold as set forth in, for example, Japanese Patent Publications Nos. JP-B-2-38377, JP-A-6-23789 and JP-A-6-246781. One primary semi-hollow body is formed in the stationary mold and the other primary semi-hollow body in the slidable mold. In primary molding, therefore, the slidable mold is set in the first position and a pair of primary semi-hollow bodies are so molded that each may have a butting or joining portion about its open end, and after they have solidified, the slidable mold is slid to the second position so that the primary semi-hollow bodies in pair may but each other at their butting portions. In secondary molding, a molten resin is injected into the joining space and the primary semi-hollow bodies in pair are joined to each other at their butting portions to form a hollow body of a synthetic resin.

The injection molding method as described above has the advantage of making it possible to automate the steps and produce a large quantity of hollow bodies, since a hollow body can be obtained by butting a pair of primary semi-hollow bodies formed by primary molding, and injecting a molten resin to fill the butted portion by secondary molding. The injection molding of a pair of primary semi-hollow bodies has features including the possibility of manufacturing even a hollow body having a complicated shape. It is, however, likely that the joined portion may be low in strength. FIGS. 6A though 6C are sectional views showing a part of an example of a hollow body obtained by the injection molding method as described above, and reference is made to FIG. 6A for the explanation of the reason for low joining strength. In FIG. 6A, A' denotes a first primary semi-hollow body and B' a second primary semi-hollow body, and the first and second primary semi-hollow bodies A' and B' are united together by the molten resin injected for secondary molding to fill the joining space S'. The joining space S' is defined about the butt ends T' of the open ends of the first and second primary semi-hollow bodies A' and B' and when the molten resin for secondary molding is injected to fill the joining space S', therefore, the first and second primary semi-hollow bodies A' and B' are joined by the joining space S' alone and the notch portions, or the butt ends T' are not welded together. Accordingly, the welding force is low. It may be thought of to reduce the thickness of the butt ends T', but as a low injection pressure for the injection of the molten resin for secondary molding into the joining space S' gives a low welding or bonding force, it is necessary to inject it with a reasonably high injection pressure. Its injection with an injection pressure required for welding causes the deformation of the thin butt ends T' and the leakage of the molten resin into the inside. For these reasons, the butt ends T' have a specific thickness.

While there is no problem if only a compressive force acts between the butt ends T' not joined together, the action of, for example, an external tensile force causes the separation of the butt ends T' from inside. Then, cracking starts at the separated portion and extends to the joining space S', as is generally the case with the destruction of a material. For these reasons, the structure as described above is unsuitable for any use calling for joining strength, for example, a gasoline tank mounted in a motor vehicle for which even an accident has to be anticipated.

Therefore, various attempts have so far been made to realize an elevation of joining strength. For example, JP-A-10-16064 proposes a joint shaped as shown in FIG. 6B. In this joint, the butt ends T' of first and second primary semi-hollow bodies A' and B' are formed in an inclined way from a corner of a joining space S'. The joint proposed by JP-A-6-246781 is made by flanges formed integrally at the open ends of first and second primary semi-hollow bodies A7 and B' during primary molding and connected with a resin R' during secondary molding, as shown in FIG. 6C.

The butt ends T' of the joint shown in FIG. 6B are more resistant to deformation by the pressure of secondary molding, since they are formed in an inclined way from the corner of the joining space S'. The degree to which the pressure of secondary molding acts upon the butt ends T' is lower, since they are formed at the corner. As the butt ends T' are not joined to each other, however, a tensile force acting upon that region causes the separation of the butt ends T' and allows cracking to extend easily to the joining space S', as explained with reference to FIG. 6A. In other words, the shape of the joint still fails to solve the problems explained with reference to FIG. 6A. On the other hand, the first and second primary semi-hollow bodies A' and B' shown in FIG. 6C can be said to have a high joining strength, since their flanges are joined to each other by the secondary molding resin R' like a rivet. A third mold is, however, specifically required for secondary molding and is likely to add to the cost. Moreover, the outward appearance is not always a desirable shape.

SUMMARY OF THE INVENTION

This invention is aimed at providing a hollow body of a synthetic resin, a method for its injection molding and a mold for its molding which overcome the problems as stated above, and more specifically providing a hollow body of a synthetic resin obtained by joining a pair of primary semi-hollow bodies together and having their joint which is unlikely to crack easily by the action of not only a compressive force, but also a tensile force, and an injection molding method and a mold which enable such a hollow body of a synthetic resin to be formed at a low cost.

(1) In order to attain the object stated above, the invention provides a hollow body of a synthetic resin made by butting the open ends of a pair of primary semi-hollow bodies formed by primary injection molding, whereby a joining space is defined about the butt ends, and injecting a molten resin by secondary injection molding to unite the pair of primary semi-hollow bodies into a single body, the molten resin for the secondary molding filling the space between the butt ends.

(2) The invention may provides a hollow body of a synthetic resin made by butting the butt ends formed along inner peripheral sides of the open ends of a pair of primary semi-hollow bodies formed by primary injection molding, whereby a joining space is defined about them, and injecting a molten resin by secondary injection molding to unite the pair of primary semi-hollow bodies into a single body, the molten resin for the secondary molding filling the space between the butt ends.

(3) The invention may be so arranged that when a hollow body is obtained by primary injection molding for injecting a molten resin into a cavity defined by a slidable mold and a movable mold to form a pair of primary semi-hollow bodies so that the butting of their open ends may define a joining space about the butt ends, and secondary injection molding for uniting the pair of primary semi-hollow bodies into a single body by injecting a molten resin into the joining space defined about the butt ends of the open ends of the pair of primary semi-hollow bodies butted by sliding the slidable mold relative to the movable mold after the primary injection molding, the movable mold is opened to a specific degree during the secondary injection molding to fill the space between the butt ends with the resin for the secondary injection molding, while filling the joining space with it.

(4) The invention may be so arranged that when a hollow body is obtained by primary injection molding for injecting a molten resin into a cavity defined by a slidable mold and a movable mold to form a pair of primary semi-hollow bodies so that the butting of the butt ends defined along the inner peripheral sides of their open ends may define a joining space about the butt ends, and secondary injection molding for uniting the pair of primary semi-hollow bodies into a single body by injecting a molten resin into the joining space defined about the butt ends of the open ends of the pair of primary semi-hollow bodies butted by sliding the slidable mold relative to the movable mold after the primary injection molding, the movable mold is opened to a specific degree during the secondary injection molding to fill the space between the butt ends with the resin for the secondary injection molding, while filling the joining space with it.

(5) In the invention, the movable mold may be opened to a specific degree by the filling pressure of the resin for the secondary injection molding to fill the space between the butt ends.

(6) In the invention, the molten resin filling the joining space and the space between the butt ends may be compressed again after the space between the butt ends is filled.

(7) The invention may provides a mold comprising a slidable mold and a movable mold, each having on the side of their parting line a cavity for molding the main portion of one of at least a pair of primary semi-hollow bodies and a cavity for molding a joining portion at the open end of the main portion, the movement of the slidable mold to a first position for closing the molds and for primary molding allowing the cavities to form a pair of primary semi-hollow bodies each having a butt end and a part of a joining space at its open end, the movement of the slidable mold to a second position for closing the molds with the pair of primary semi-hollow bodies held therein allowing the butting of the butt ends of the open ends of the pair of primary semi-hollow bodies to define the joining space about them, the pair of primary semi-hollow bodies being united into a single body by filling the joining space by injection with a molten resin for secondary molding, wherein the movable mold can be opened to a specific degree during the secondary molding in the second position.

(8) The invention may provides a mold comprising a slidable mold and a movable mold, each having on the side of their parting line a cavity for molding the main portion of one of at least a pair of primary semi-hollow bodies and a cavity for molding a joining portion at the open end of the main portion, the movement of the slidable mold to a first position for closing the molds and for primary molding allowing the cavities to form a pair of primary semi-hollow bodies each having a butt end and a part of a joining space at its open end, the movement of the slidable mold to a second position for closing the molds with the pair of primary semi-hollow bodies held therein allowing the butting of the butt ends of the open ends of the pair of primary semi-hollow bodies to define the joining space about them, the pair of primary semi-hollow bodies being united into a single body by filling the joining space by injection with a molten resin for secondary molding, wherein the movable mold can be opened to a specific degree in the second position by the filling pressure of the molten resin for the secondary molding.

(9) In the invention, the mold opened to a specific degree in the second position can be closed again.

BRIEF DESCRIPTION OF THE DRAWINGS

FIG. 1A is in the position in which a pair of primary semi-hollow bodies are butted against each other, FIG. 1B is in the position in which the joining space between the primary semi-hollow bodies is filled with a secondary molding resin.

FIG. 2A is a cross sectional view of the whole.

FIGS. 3A through 3B are views showing stages of molding of a hollow body of a synthetic resin according to this invention, or FIG. 3A is a cross sectional view showing the stage in which primary molding has been finished, and FIG. 3B is a cross sectional view showing the stage in which the joining space has been filled with a molten resin for secondary molding.

FIGS. 4A and 4B are views showing stages of molding of a hollow body of a synthetic resin according to this invention, or FIG. 4A is a cross sectional view showing the stage in which the movable mold has been opened and the joining space and the space between the butt ends have been filled with a molten resin for secondary molding, and FIG. 4B is a cross sectional view showing the stage in which the movable mold has been tightly closed again and the molten resin in the joining space and between the butt ends has been compressed.

FIG. 5A is a cross sectional view showing a first other mode.

DETAILED DESCRIPTION OF THE PREFERRED EMBODIMENTS

Figure 1A:
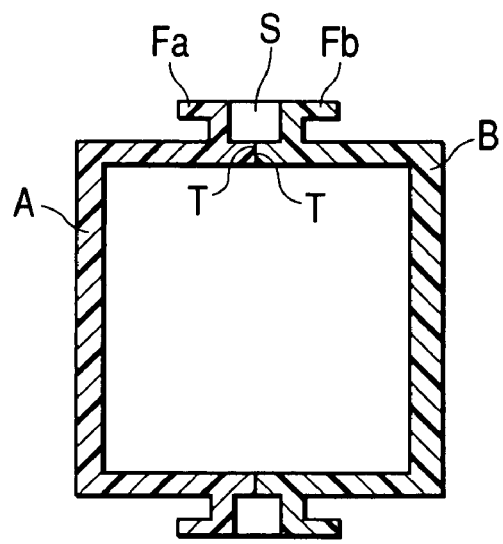
FIGS. 1A through 1B are views showing various stages of molding of a hollow body of a synthetic resin according to this invention, or cross sectional views showing a pair of primary semi-hollow bodies.
Figure 1B:
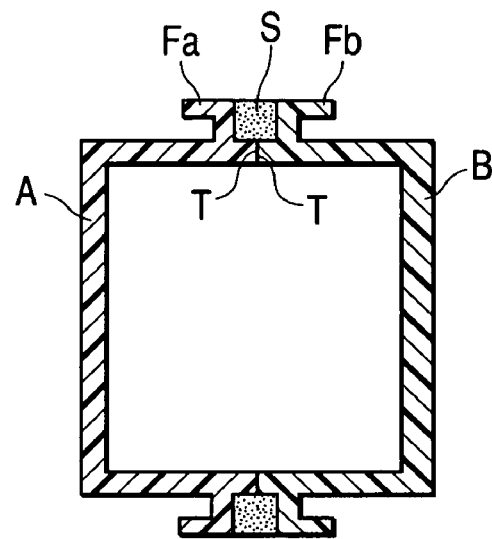
Figure 1C:
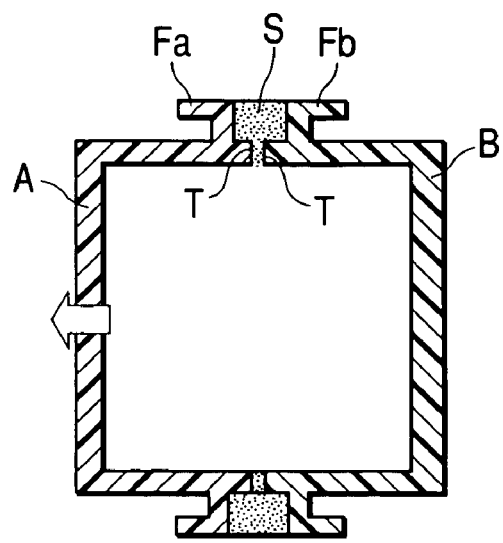
FIG. 1C is in the position in which the space between the butt ends of the primary semi-hollow bodies is filled with the resin.

The molding principle of a hollow body of a synthetic resin according a mode of carrying out the invention will first be described with reference to FIGS. 1A though 1D. A first and a second primary semi-hollow body A and B are formed by primary injection molding. At the same time, outwardly projecting flanges Fa and Fb are integrally formed at the open ends of the first and second primary semi-hollow bodies A and B. While they stay in the mold, the mold is so closed that the notch portion, or butt ends T at their open ends may butt each other, as shown in FIG. 1A. As a result, a joining space S is defined about the butt ends T. A molten resin for secondary molding is injected at a specific pressure to fill the joining space S. The resin as injected is shown in FIG. 1B. Then, the mold is opened to a specific degree, for example, by 0.5 to 5.0 mm. The pressure of the molten resin being injected causes a part of the molten resin to fill the space between the butt ends T, as shown in FIG. 1C. After cooling and solidification, the mold is opened to yield a hollow body of a synthetic resin joined along the joining space S and the butt ends T.

Figure 1D:
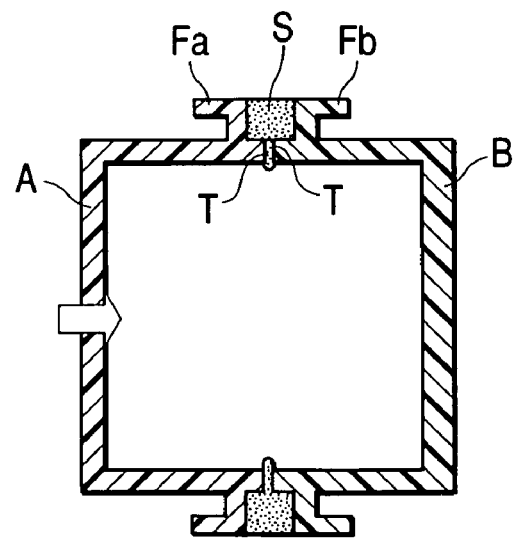
FIG. 1D is in the position in which the resin filling the joining space between the primary semi-hollow bodies and the space between their butt ends is compressed.

Alternatively, the mold is closed before the solidification of the molten resin after the molten resin for secondary molding has filled the space between the butt ends T, as shown in FIG. 1C. As a result, the resin in the joining space S and between the butt ends T is compressed and a hollow body of a synthetic resin having a still higher joining strength can be obtained, though a part of the resin may leak to the inside, as shown in FIG. 1D.

A hollow body of a synthetic resin can also be obtained as will now be described. The mold is so closed for the secondary molding as to be opened to a specific degree by a specific resin pressure. For example, the mold is closed for the secondary molding by means of a fluid pressure, or a spring, or other elastic material. Then, the secondary molding is started as described before. The molten resin for the secondary molding is injected to fill the joining space and when its pressure has risen to a specific level, the mold is opened to a specific degree by resisting the elastic material. As a result, the space between the butt ends is also opened to the specific degree and filled. After cooling and solidification, the mold is opened to yield a hollow body of a synthetic resin joined between the butt ends T, too. The resin in the joining space S and between the butt ends T is compressed after filling, as stated before, if required.

In order to obtain a hollow body of a synthetic resin as described above, it is desirable to carry out secondary molding while holding a pair of first and second primary semi-hollow bodies in the molds in which they have respectively been formed, it is also possible to form primary semi-hollow bodies in separate molds, insert them in a mold for secondary molding and fill the space between the butt ends, too, with the secondary molding resin as described above. While the molten resin for secondary molding is injected into the joining space through a runner and a gate, the runner may be a ring runner, or ring passage for secondary molding surrounding the joining space, and the gate may be composed of a plurality of gates situated at specific intervals. It may alternatively be a disk gate keeping continuous communication between the ring runner and the joining space.

More specific modes of carrying out the invention will now be described by way of a mold for forming a hollow body and a molding method employing it. The mold embodying this invention is shown in FIG. 2A and is composed of a stationary plate 1 situated on the right-hand side of the figure, a stationary mold 5 secured to the stationary plate 1, a slidable mold 10 which is driven for sliding vertically in the figure, a movable mold 30 attached to a movable plate 28 by a movable mold plate 29, etc.

The stationary plate 1 has an opening 3 made across it substantially in its central axial portion for having an injector nozzle 2 inserted therein. The stationary mold 5 has a main sprue 6 aligned with the opening 3. An apparatus for driving the slidable mold 10 vertically is composed of a piston-cylinder unit 11 which includes a piston rod 12 having an end secured to the top of the slidable mold 10 and a cylinder having a bottom connected to the top of the stationary mold 5 by a horizontally extending arm 13 and a supporting post 14. Thus, when a working fluid is supplied to and discharged from the piston-cylinder unit 11, the slidable mold 10 is driven for sliding vertically of the stationary mold 5 between a first and a second position.

On its side facing the stationary mold 5, the slidable mold 10 driven for sliding as described above has a primary runner 15 for primary molding connected with the main sprue 6. A first and a second primary sprue 16 and 17 for primary molding extend from the primary runner 15 across the slidable mold 10 and vertically symmetrically of the main sprue 6 as viewed in the figure. It also has a secondary runner 18 for secondary molding formed below the primary runner 15 on its side facing the stationary mold 5. A secondary sprue 19 for secondary molding formed across the slidable mold 10 is connected with the secondary runner 18.

Figure 2A:
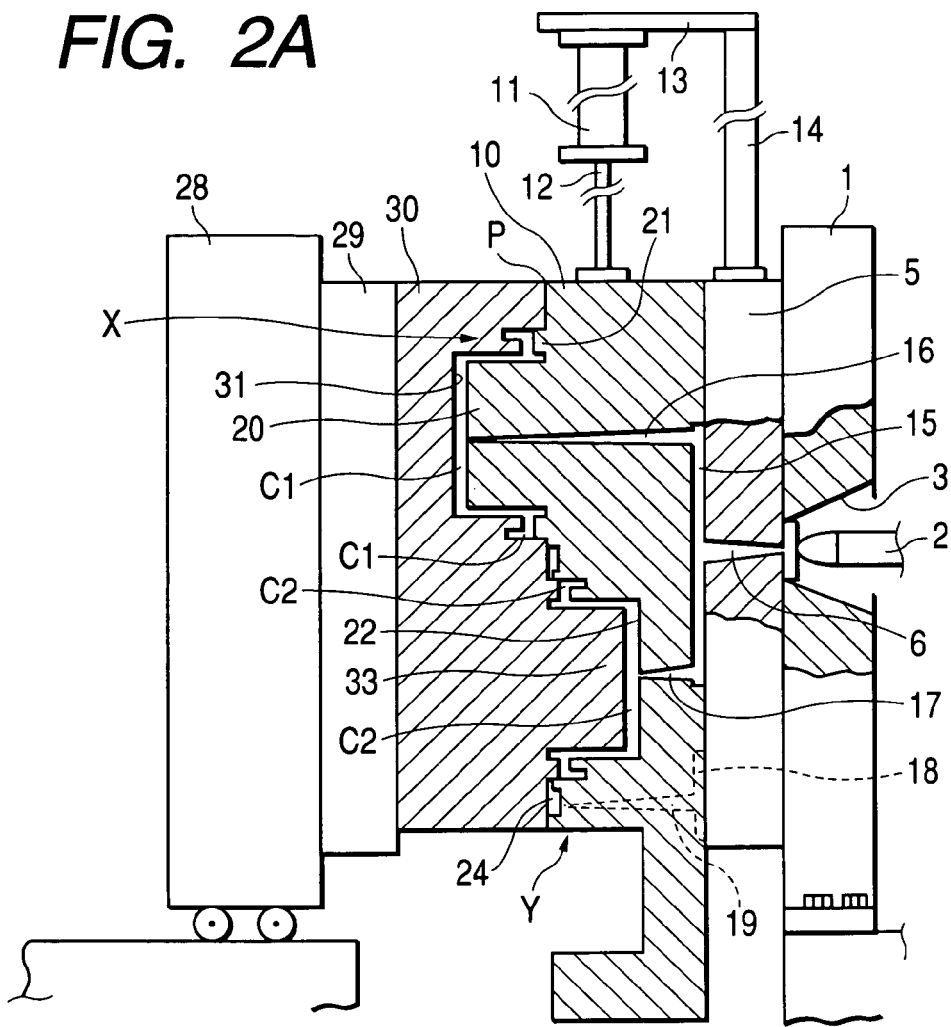
FIGS. 2A though 2C are views showing a mode of embodying a mold according to this invention.
Figure 2B:
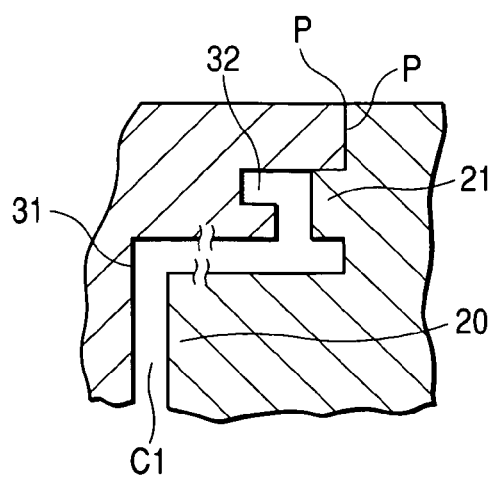
FIG. 2B is an enlarged cross sectional view of the portion marked X in FIG. 2A.

The slidable mold 10 has a specifically sized slidable core 20 formed in its upper portion, protruding outwardly from a parting line P and having a square shape in side elevation, as shown in FIGS. 2A and 2B. The first primary sprue 16 stated before is open in the top of the slidable core 20 via a gate. The slidable core 20 is surrounded by a small annular core 21 of relatively small height spaced from the core 20 by a specific distance equal to the wall thickness of a first primary semi-hollow body. The slidable core 20 cooperates with the movable mold 30 in defining a cavity for molding a first primary semi-hollow body as will later be described in detail, while the small annular core 21 cooperates with the movable mold 30 in defining a cavity for molding the butt end of the first primary semi-hollow body and a half of a joining space.

Figure 2C:
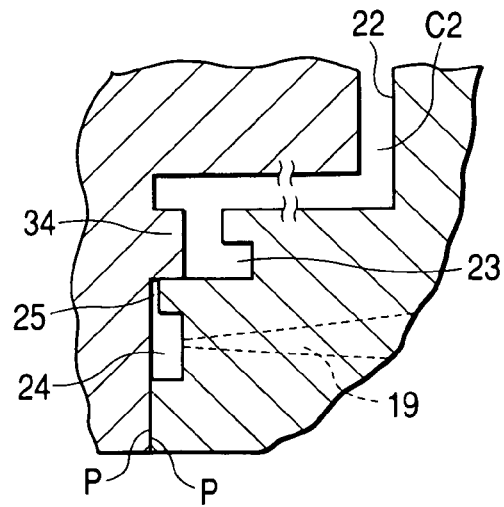
FIG. 2C is an enlarged cross sectional view of the portion marked Y in FIG. 2A.

The slidable mold 10 has a specifically sized slidable concavity 22 formed in its lower portion as viewed in FIG. 2A, open on the side of the parting line P and having a square shape in side elevation. The second primary sprue 17 is open in the bottom of the slidable concavity 22 via a gate. The slidable concavity 22 is surrounded by a small annular concavity 23 of relatively small depth spaced from the slidable concavity 22 by a specific distance equal to the wall thickness of a second primary semi-hollow body, as shown enlarged in FIG. 2C. The small concavity 23 is surrounded by a secondary ring passage 24 connected with the secondary sprue 19. The secondary ring passage 24 is connected with a secondary gate 25 composed of a plurality of gates or film gates. The secondary gate 25 is open in a side of a small core 34 on the movable mold 30 as will be described. The slidable concavity 22 cooperates with the movable mold 30 in defining a second cavity for molding the main portion of a second primary semi-hollow body. The small concavity 23 and the small core on the movable mold define a cavity for molding the butt end of the second primary semi-hollow body and a half of the joining space.

The movable mold 30 has a specifically sized movable concavity 31 formed in its upper portion as viewed in FIG. 2A, open on the side of the parting line P and having a square shape in side elevation. The movable concavity 31 and the slidable core 20 described above define the first cavity for molding the first primary semi-hollow body. The movable concavity 31 is surrounded by a small concavity 32 of relatively small depth having a specific distance from the movable concavity 31, as shown in FIG. 2B. The small concavity 32 and the small core 21 on the slidable core 10 described above define the cavity for molding the butt end of the first primary semi-hollow body and a half of the joining space.

The movable mold 30 has a specifically sized movable core 33 formed in its lower portion, protruding outwardly from the parting line P and having a square shape in side elevation. The movable core 33 is surrounded by a small core 34 of relatively small height having a specific distance from the core 33, as shown enlarged in FIG. 2C. The movable core 33 and the slidable concavity 22 cooperate in defining the cavity for molding the main portion of the second primary semi-hollow body and the small core 34 and the small concavity 23 of the slidable mold 10 define the cavity for molding the butt end of the second primary semi-hollow body and a half of the joining space.

Description will now be made of a molding method employing the slidable mold 10, movable mold 30, etc. as described above, for forming a first and a second primary semi-hollow body by primary injection molding and for forming a hollow body by injecting a molten resin into a joining portion at their open ends for secondary molding. The movable mold 30 can be opened to a specific degree, for example, by 0.5 to 5.0 mm during secondary injection molding, and closed again, though no mold clamping device is shown in the drawings.

The slidable mold 10 is slid to its first position as shown in FIG. 2A to close the mold. A first cavity C1 in which the main portion of a first primary semi-hollow body is molded is defined by the slidable core 20 of the slidable mold 10 and the movable concavity 31 of the movable mold 30, and a small cavity c1 in which a joining portion is formed is defined about it. Likewise, a second cavity C2 in which the main portion of a second primary semi-hollow body is molded is defined by the slidable concavity 22 of the slidable mold 10 and the movable core 33 of the movable mold 30, and a small cavity c2 in which the joining portion is formed is defined about it.

A molten resin for primary molding is injected through the injector nozzle 2 in a known way. The molten resin flows through the main sprue 6 in the stationary plate 1, is distributed by the primary runner 15 and flows through the first and second primary sprues 16 and 17 and the gates to be injected into and fill the first and second cavities C1 and C2. The first and second primary semi-hollow bodies A and B as molded upon injection and filling are shown in FIG. 3A. The primary molding forms a flange Fa or Fb, a butt end T and a half of a joining space S at the open end of each of the first and second primary semi-hollow bodies A and B, as shown in FIGS. 1A through 1D.

After a certain degree of cooling and solidification, the movable mold 30 is opened by a specific distance. Then, the slidable mold 10 is slid upward with the second primary semi-hollow body B left therein to its second position in which the open end of the second primary semi-hollow body B is aligned with that of the first primary semi-hollow body A. Then, the mold is closed. As a result, the butt ends T of the first and second primary semi-hollow bodies A and B abut on each other as shown in FIGS. 3B and 1A, and the joining space S is defined by the outer surfaces of the butt ends, the inner surfaces of the flanges Fa and Fb, the wall surface of the small concavity 23 of the slidable mold 10 and the wall surface of the small concavity 32 of the movable mold 30. The mold as closed in its second position is shown in FIG. 3B. When the mold is closed in its second position, the main sprue 6 is connected with the secondary runner 18. Then, a molten resin for secondary molding is injected. The molten resin flows through the main sprue 6, secondary runner 18 and secondary sprue 19 into the secondary ring passage 24. Then, it flows through the secondary gate 25 and fills the joining space S. During its filling, the movable mold 30 is opened to a specific degree. As a result, the butt ends T are opened to a specific degree, as the movable mold 30 is opened while holding the first primary semi-hollow body A therein. The pressure of the molten resin for secondary molding causes it to reach between the butt ends T. Thus, it fills the space between the butt ends T, too. The space between the butt ends T as filled with the resin is shown in FIG. 4A. After its cooling and solidification, the movable mold is opened, whereupon a hollow body is ejected by an ejector pin not shown.

Alternatively, the movable mold 30 is tightly closed again as shown in FIG. 4B before the solidification of the resin filling the space between the butt ends T, too. As a result, the resin in the joining space S and between the butt ends T is compressed to yield a hollow body having a still higher joining strength.

Figure 5A:
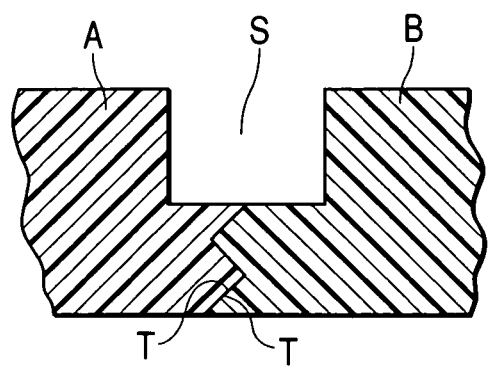
FIGS. 5A though 5D are views showing a part of other modes of embodying a joint on a hollow body of a synthetic resin according to this invention.
Figure 5B:
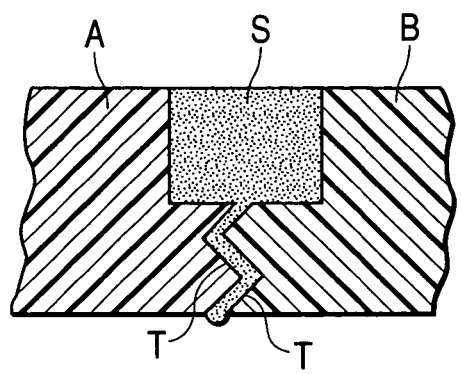
FIG. 5B is a cross sectional view showing the state in which its joining space is filled with a resin.
Figure 5C:
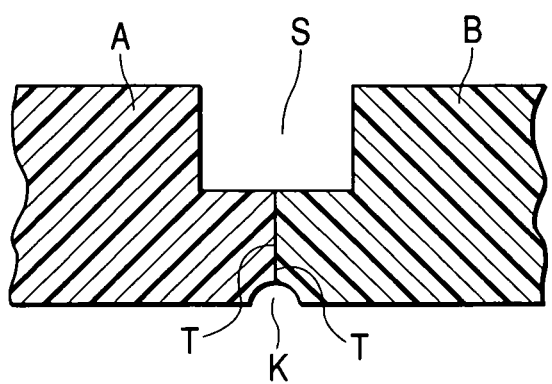
FIG. 5C is a cross sectional view showing a second other mode.
Figure 5D:
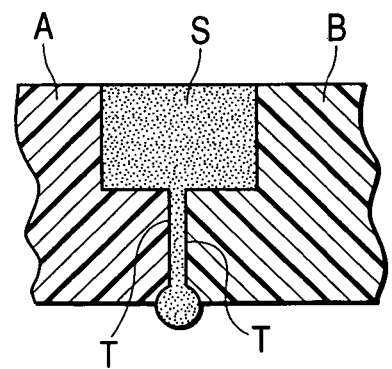
FIG. 5D is a cross sectional view showing the state in which its joining space is filled with a resin.
Figure 6A:
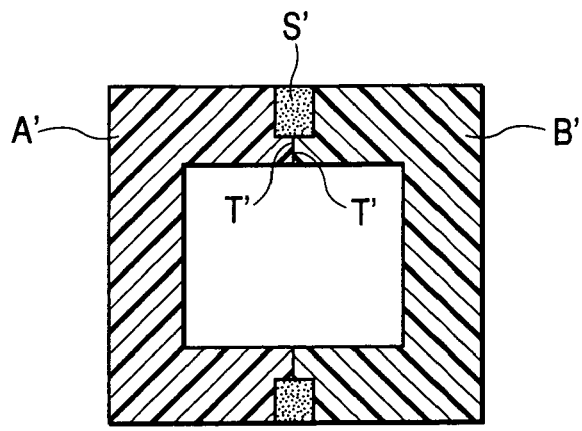
FIGS. 6A though 6C are views showing known examples of joints on a hollow body of a synthetic resin, or cross sectional views showing different known examples.
Figure 6B:
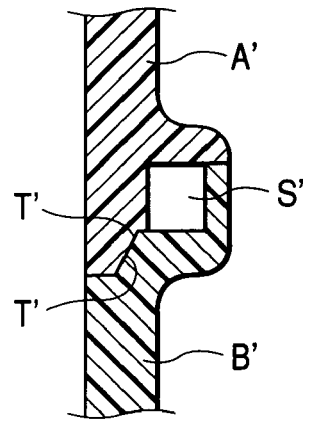
Figure 6C:
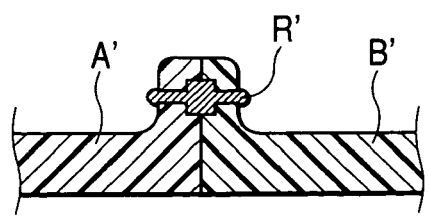

This invention is not limited to the modes of carrying it out as described above, but can be carried out in various other forms, too. For example, it is obvious that the shapes of the joining space and the butt ends of the first and second primary semi-hollow bodies, etc. are not limited to the modes as described above, but can be realized in other forms, too. Other forms of butt ends are shown in FIGS. 5A though 5D. FIG. 5A shows butt ends T having a zigzag cross section and the zigzag form gives a higher joining strength owing to a longer resin filling, or joining distance than a straight line, as shown in FIG. 5B. If a ring-shaped cut K is formed along the inner edges of the butt ends T as shown in FIG. 5C, the cut K traps any excessive resin occurring from the tight closure of the mold, as shown in FIG. 5D, when the mold is tightly closed again after the space between the butt ends T is filled with the molten resin for secondary molding.

Although the modes as described before have been such that the movable mold is opened to a specific degree during secondary molding, or is opened to a specific degree by the pressure of the secondary molding resin to allow the molten resin to fill the space between the butt ends T, too, it is also possible to carry out the invention in such a way that the movable mold is opened to a specific degree before the injection of the secondary molding resin to allow the molten resin to fill the space between the butt ends T. In this connection, it is also possible to close the movable mold tightly before the solidification of the molten resin filling the space to compress the secondary molding resin.

The hollow body of a synthetic resin according to this invention is a hollow body made by butting the open ends of a pair of primary semi-hollow bodies formed by primary injection molding, or the butt ends formed along the inner peripheral sides of the open ends thereof, whereby a joining space is defined about the butt ends, and injecting a molten resin by secondary injection molding to unite the pair of primary semi-hollow bodies into a single body, and as the pair of primary semi-hollow bodies are joined together along the butt ends and the joining space surrounding them, no cracking occurs to the joint even if not only a compressive force, but also an external tensile force may act upon the joint, as explained before. In other words, the hollow body of a synthetic resin according to this invention can withstand both internal and external pressure.

According to another aspect of the invention, it is possible to obtain a hollow body of a synthetic resin which can withstand both internal and external pressure, since when a hollow body is obtained by primary injection molding for injecting a molten resin into a cavity defined by a slidable mold and a movable mold to form a pair of primary semi-hollow bodies so that the butting of their open ends, or the butting of the butt ends defined along the inner peripheral sides of their open ends may define a joining space about the butt ends, and secondary injection molding for uniting the pair of primary semi-hollow bodies into a single body by injecting a molten resin into the joining space defined about the butt ends of the open ends of the pair of primary semi-hollow bodies butted by sliding the slidable mold relative to the movable mold after the primary injection molding, the movable mold is opened to a specific degree, or is opened to a specific degree by the filling pressure of the resin for the secondary injection molding to fill the space between the butt ends with the resin for the secondary injection molding, while filling the joining space with it, during the secondary injection molding. It is possible to mold such a hollow body of a synthetic resin having a high joining strength accurately, at a low cost and automatically by an injection molding method without employing any special technology.

According to still another aspect of the invention, it is possible to obtain a hollow body of a synthetic resin having a still higher joining strength, as the molten resin filling the joining space and the space between the butt ends is compressed again.

What is claimed is:

1. A method for forming a resin hollow body by injection molding, comprising the steps of:
   a primary injection molding of forming a pair of primary semi-hollow bodies by injecting a molten resin into cavities defined by a slidable mold and a movable mold;
   butting open ends of the semi-hollow bodies at butt ends thereof so as to define a joining space on an outer periphery of the butt ends by sliding the slidable mold relative to the movable mold after the primary injection molding, and
   a secondary injection molding for uniting the primary semi-hollow bodies into a single body by injecting a molten resin so as to fill the joining space;
   wherein the movable mold is moved at a predetermined degree during the secondary injection molding to thereby fill a space between the butt ends with the molten resin, wherein the movable mold is moved at the predetermined degree by the filling pressure of the molten resin to fill the space between the butt ends.

2. A method for forming the resin hollow body by injection molding according to claim 1, wherein the butt ends are formed along inner peripheral sides of the open ends of each semi-hollow bodies.

3. The method according to claim 1, wherein the molten resin filling the joining space and the space between the butt ends is compressed after the space between the butt ends is filled.

* * * * *